(12) United States Patent
Nakamura et al.

(10) Patent No.: US 8,697,244 B2
(45) Date of Patent: Apr. 15, 2014

(54) ADHESIVE COMPOSITION AND ADHESIVE FILM USING THE SAME

(75) Inventors: Shigehiro Nakamura, Kamisu (JP);
Toshihiko Itou, Kamisu (JP);
Youichirou Mansei, Kamisu (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 12/601,066

(22) PCT Filed: May 20, 2008

(86) PCT No.: PCT/JP2008/059234
§ 371 (c)(1),
(2), (4) Date: May 21, 2010

(87) PCT Pub. No.: WO2008/143253
PCT Pub. Date: Nov. 27, 2008

(65) Prior Publication Data
US 2010/0240821 A1   Sep. 23, 2010

(30) Foreign Application Priority Data

May 21, 2007   (JP) ............................. P2007-134415

(51) Int. Cl.
*B32B 27/34* (2006.01)
*B32B 27/38* (2006.01)
*C08L 77/10* (2006.01)
*C08L 79/08* (2006.01)

(52) U.S. Cl.
USPC ........ 428/473.5; 428/418; 525/420; 525/423; 525/436; 525/476; 525/533

(58) Field of Classification Search
USPC .......... 525/420, 423, 436, 476, 533; 428/418, 428/473.5, 474.4
See application file for complete search history.

(56) References Cited

U.S. PATENT DOCUMENTS

2005/0054776 A1*   3/2005   Itou et al. ................... 525/191
2005/0181215 A1*   8/2005   Suzuki et al. ............... 428/418

FOREIGN PATENT DOCUMENTS

| CN | 1654539 | 8/2005 |
|---|---|---|
| JP | 11-217503 | 8/1999 |
| JP | 2001-152015 | 6/2001 |
| JP | 2002-161205 | * 6/2002 |
| JP | 2003-238806 | 8/2003 |
| JP | 2005-162945 | 6/2005 |
| JP | 2005-248164 | 9/2005 |
| JP | 2006-70176 | 3/2006 |
| JP | 2007-099956 | 4/2007 |
| WO | WO 03/022929 | 3/2003 |
| WO | WO 2008/041426 A1 | 4/2008 |

OTHER PUBLICATIONS

Translation of the International Preliminary Report on Patentability dated Jan. 21, 2010, for International Application No. PCT/JP2008/059234.

\* cited by examiner

*Primary Examiner* — Ana Woodward
(74) *Attorney, Agent, or Firm* — Antonelli, Terry, Stout & Kraus, LLP.

(57) ABSTRACT

A thermosetting adhesive composition comprising (A) a modified polyamideimide resin that dissolves in organic solvents, (B) a thermosetting resin and (C) a curing agent or curing accelerator.

9 Claims, 1 Drawing Sheet

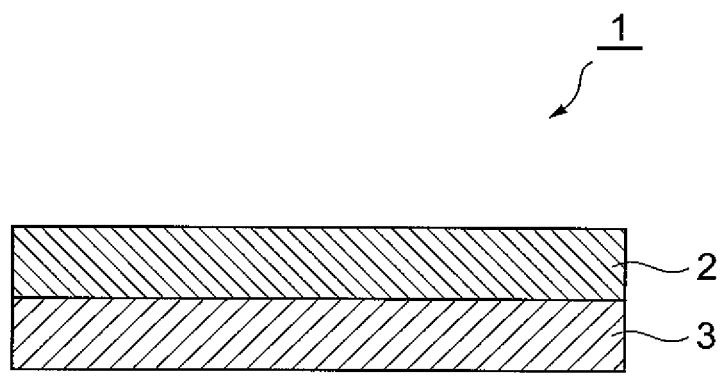

ADHESIVE COMPOSITION AND ADHESIVE FILM USING THE SAME

TECHNICAL FIELD

The present invention relates to an adhesive composition and to an adhesive film employing it.

BACKGROUND ART

The rapid advances in size and weight reduction of various electronic devices in recent years are leading to increased mounting densities for electronic parts, and the electronic parts and materials used therein are being required to exhibit a greater variety of properties. Printed circuit boards, in particular, being produced with smaller wiring areas and higher wiring densities, are being required to meet demands for multilayer wiring boards (build-up wiring boards), flexible circuit boards (FPC) and the like. Such printed circuit boards are produced using various adhesives or adhesive films. The resins used as adhesives are primarily epoxy resins and acrylic resins. However, all such resins have been inadequate from the viewpoint of properties such as heat resistance and electrical insulation.

Polyimide resins and polyamideimide resins are well-known as adhesive compositions that exhibit heat resistance and electrical insulating properties.

[Patent document 1] Japanese Unexamined Patent Publication No. HEI 11-217503

DISCLOSURE OF THE INVENTION

Problems to be Solved by the Invention

The conventional polyamideimide resin-containing adhesive compositions have not always exhibited satisfactory adhesion and heat resistance after standing for long periods in high temperature or high-temperature, high-humidity environments.

The present invention has been accomplished in light of these circumstances, and its object is to provide an adhesive composition that can maintain excellent adhesion and heat resistance even after standing for long periods in high temperature or high-temperature, high-humidity environments.

Means for Solving the Problems

The adhesive composition of the invention is a thermosetting adhesive composition comprising (A) a modified polyamideimide resin that dissolves in organic solvents, (B) a thermosetting resin and (C) a curing agent or curing accelerator.

As a result of much diligent research directed toward solving the problems mentioned above, the present inventors have found that an adhesive composition having this composition maintains excellent adhesion and heat resistance even after standing for long periods in high temperature or high-temperature, high-humidity environments.

The adhesive composition of the invention preferably cures by heat to form a cured product with a glass transition temperature of 100-260° C. The modified polyamideimide resin preferably includes a polysiloxane chain. The adhesive composition of the invention preferably comprises the thermosetting resin at 5-100 parts by weight with respect to 100 parts by weight of the modified polyamideimide resin.

The modified polyamideimide resin is preferably a resin obtained by reacting a diimidedicarboxylic acid mixture containing a diimidedicarboxylic acid represented by the following general formula (1a), a diimidedicarboxylic acid represented by the following general formula (1b) and a diimidedicarboxylic acid represented by the following general formula (1c), with an aromatic diisocyanate represented by the following chemical formula (2a), (2b), (2c), (2d) or (2e).

[Chemical Formula 1]

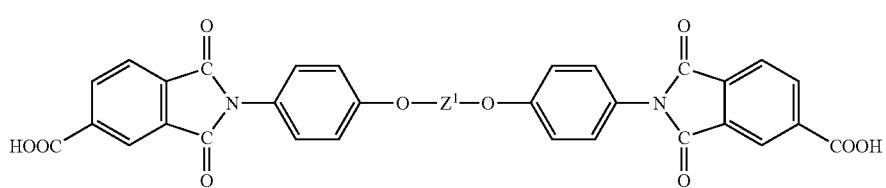

(1a)

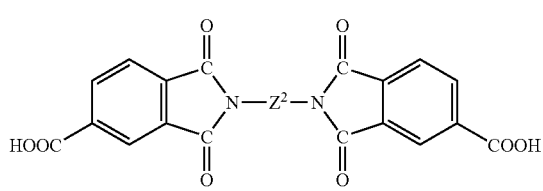

(1b)

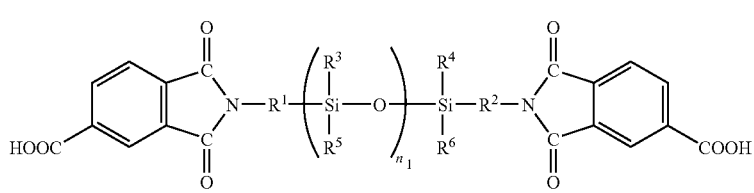

(1c)

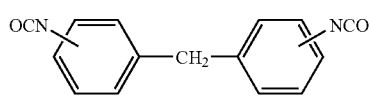
(2a)

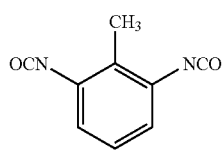
(2c)

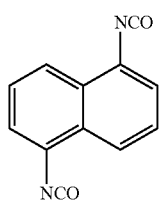
(2e)

-continued

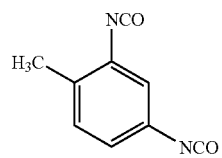
(2b)

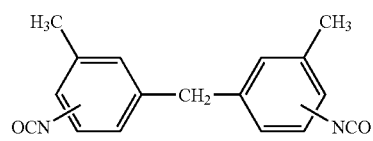
(2d)

$Z^1$ in formulas (1a) and (3a) are each a divalent organic group represented by the following general formula (11), (12), (13), (14), (15), (16), (17) or (18), $Z^2$ in formulas (1b) and (3b) are each a divalent organic group represented by the following general formula (21), (22), (23), (24), (25), (26) or (27), $R^1$ and $R^2$ in formulas (1c) and (3c) are each independently a divalent organic group, $R^3$, $R^4$, $R^5$ and $R^6$ are each independently a $C_{1-20}$ alkyl or $C_{6-18}$ aryl group, and $n_1$ represents an integer of 1-50.

[Chemical Formula 2]

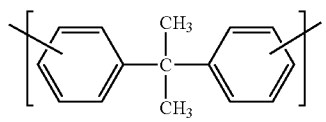
(11)

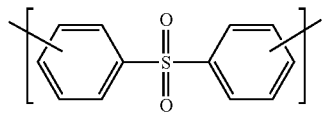
(12)

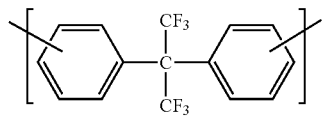
(13)

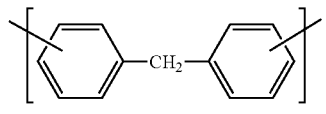
(14)

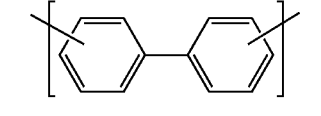
(15)

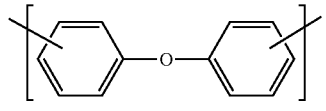
(16)

-continued

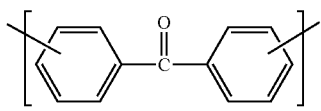
(17)

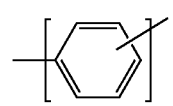
(18)

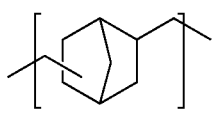
(21)

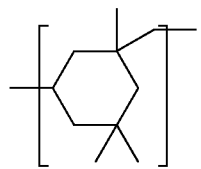
(22)

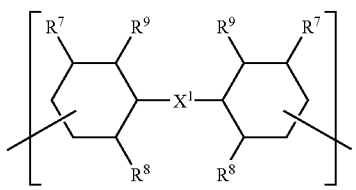
(23)

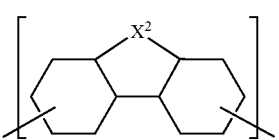
(24)

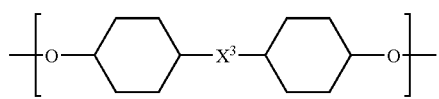
(25)

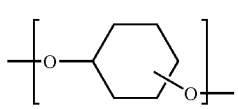

(26)

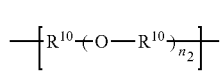

(27)

$X^1$ in formula (23) is a $C_{1-3}$ aliphatic hydrocarbon, $C_{1-3}$ halogenated aliphatic hydrocarbon, sulfonyl, oxy, carbonyl or single bond, $R^7$, $R^8$ and $R^9$ are each independently hydrogen, hydroxyl, methoxy, methyl or a halogenated methyl group, $X^2$ in formula (24) is a $C_{1-3}$ aliphatic hydrocarbon, $C_{1-3}$ halogenated aliphatic hydrocarbon, sulfonyl, oxy or carbonyl group, $X^3$ in formula (25) is a $C_{1-3}$ aliphatic hydrocarbon, $C_{1-3}$ halogenated aliphatic hydrocarbon, sulfonyl, oxy, carbonyl or single bond, $R^{10}$ in formula (27) is an alkylene group, and $n_2$ represents an integer of 1-70.

General formula (1a) has 3 or more aromatic rings, general formula (1b) has an aliphatic group or alicyclic structure, and general formula (1c) has a polysiloxane chain. Thus, the modified polyamideimide resin backbone contains an aliphatic unit, alicyclic unit or siloxane unit as a soft segment and an aromatic diisocyanate-derived aromatic unit as a hard segment, in a fixed combination. With this combination, the adhesive composition can form a microphase separation structure after curing or after a crosslinked structure has been at least partially formed, and the present inventors believe that the presence of the microphase separation structure produces a specific stress relaxation effect in the adhesive composition. Presumably due to this specific stress relaxation effect, the adhesive composition exhibits more excellent adhesion even after standing for long periods in high temperature or high-temperature, high-humidity environments.

The thermosetting resin preferably comprises an epoxy resin with two or more epoxy groups and alicyclic groups.

The adhesive film of the invention comprises a support film, and an adhesive layer composed of an adhesive composition formed on the support film.

Effect of the Invention

According to the invention there is provided an adhesive composition that can maintain excellent adhesion and heat resistance even after standing for long periods in high temperature or high-temperature, high-humidity environments. Also according to the invention, it is possible to minimize the use of organic solvents that affect the environment and the human body, while also lowering production cost.

BRIEF DESCRIPTION OF THE DRAWINGS

FIG. 1 is a cross-sectional view showing an embodiment of an adhesive film according to the invention.

EXPLANATION OF SYMBOLS

1: Adhesive film, 2: adhesive layer, 3: support film.

BEST MODE FOR CARRYING OUT THE INVENTION

Preferred embodiments of the invention will now be explained in detail, with reference to the accompanying drawings. Throughout the explanation of the drawings, corresponding elements will be referred to by the same reference numerals and will be explained only once. For convenience of illustration, the dimensional proportions in the drawings may not match those explained in the text.

The adhesive composition of the invention comprises (A) a modified polyamideimide resin that dissolves in organic solvents, (B) a thermosetting resin and (C) a curing agent or curing accelerator. This will allow excellent adhesion and heat resistance to be maintained even after standing for long periods in high temperature or high-temperature, high-humidity environments.

The adhesive composition of the invention preferably cures by heat to form a cured product with a glass transition temperature of 100-260° C. The glass transition temperature is more preferably 120-200° C.

The modified polyamideimide resin may be obtained, for example, by reacting a diimidedicarboxylic acid mixture containing a diimidedicarboxylic acid represented by the following general formula (1a), a diimidedicarboxylic acid represented by the following general formula (1b) and a diimidedicarboxylic acid represented by the following general formula (1c), with an aromatic diisocyanate represented by the following chemical formula (2a), (2b), (2c), (2d) or (2e).

[Chemical Formula 3]

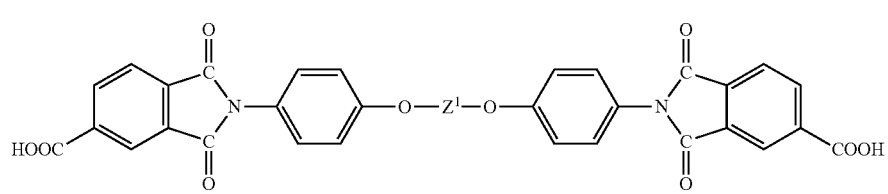

(1a)

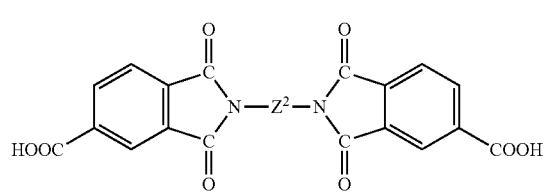

(1b)

-continued

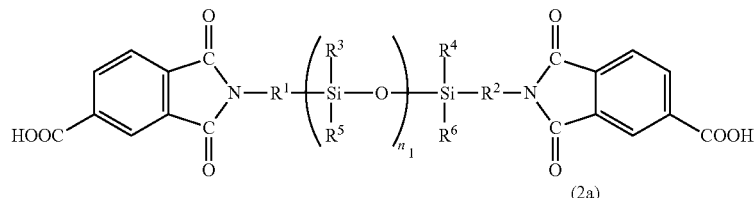
(1c)

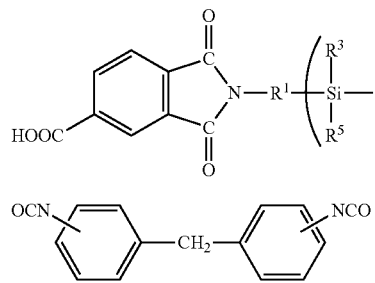
(2a)

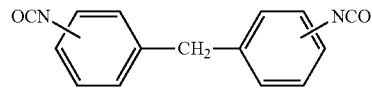
(2b)

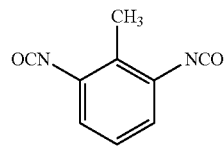
(2c)

(2d)

(2e)

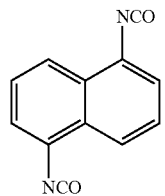

$Z^1$ in formulas (1a) and (3a) are each a divalent organic group represented by the following general formula (11), (12), (13), (14), (15), (16), (17) or (18), $Z^2$ in formulas (1b) and (3b) are each a divalent organic group represented by the following general formula (21), (22), (23), (24), (25), (26) or (27), $R^1$ and $R^2$ in formulas (1c) and (3c) are each independently a divalent organic group, $R^3$, $R^4$, $R^5$ and $R^6$ are each independently a $C_{1-20}$ alkyl or $C_{6-18}$ aryl group, and $n_1$ represents an integer of 1-50.

[Chemical Formula 4]

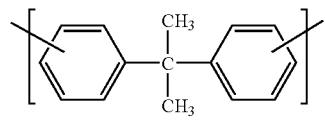
(11)

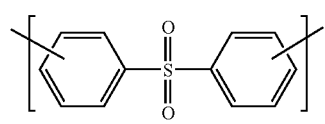
(12)

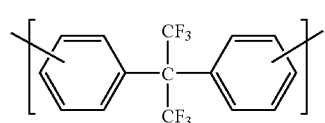
(13)

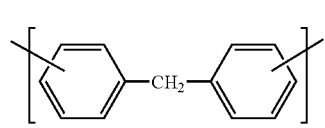
(14)

-continued

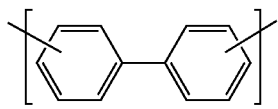
(15)

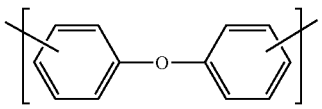
(16)

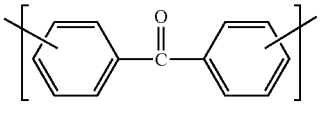
(17)

(18)

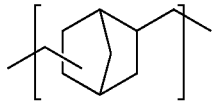
(21)

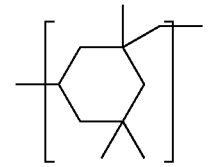
(22)

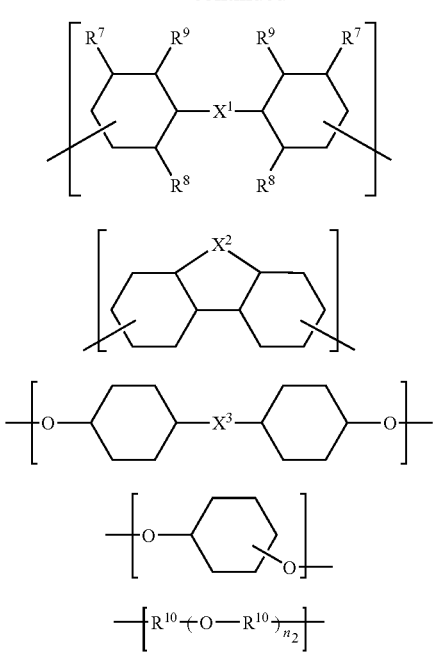

(23)

(24)

(25)

(26)

(27)

$X^1$ in formula (23) is a $C_{1-3}$ aliphatic hydrocarbon, $C_{1-3}$ halogenated aliphatic hydrocarbon, sulfonyl, oxy, carbonyl or single bond, $R^7$, $R^8$ and $R^9$ are each independently hydrogen, hydroxyl, methoxy, methyl or a halogenated methyl group, $X^2$ in formula (24) is a $C_{1-3}$ aliphatic hydrocarbon, $C_{1-3}$ halogenated aliphatic hydrocarbon, sulfonyl, oxy or carbonyl group, $X^3$ in formula (25) is a $C_{1-3}$ aliphatic hydrocarbon, $C_{1-3}$ halogenated aliphatic hydrocarbon, sulfonyl, oxy, carbonyl or single bond, $R^{10}$ in formula (27) is an alkylene group, and $n_2$ represents an integer of 1-70.

The diimidedicarboxylic acid mixture may be obtained, for example, by reacting a diamine mixture containing a diamine represented by the following general formula (3a), a diamine represented by the following general formula (3b) and a diamine represented by the following general formula (3c), with trimellitic anhydride.

[Chemical Formula 5]

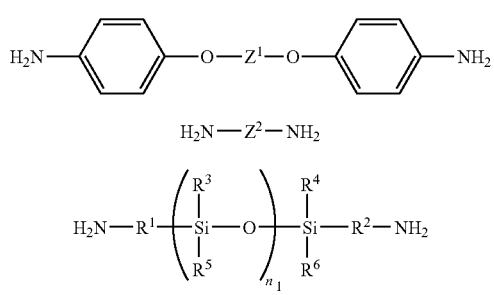

(3a)

(3b)

(3c)

As specific examples of diamines represented by general formula (3a) above having 3 or more aromatic rings, there may be mentioned 2,2-bis[4-(4-aminophenoxy)phenyl]propane (hereinafter abbreviated as "BAPP"), bis[4-(3-aminophenoxy)phenyl]sulfone, 2,2-bis[4-(4-aminophenoxy)phenyl]hexafluoropropane, bis[4-(4-aminophenoxy)phenyl]methane, 4,4'-bis(4-aminophenoxy)biphenyl, bis[4-(4-aminophenoxy)phenyl]ether, bis[4-(4-aminophenoxy)phenyl]ketone, 1,3-bis(4-aminophenoxy)benzene and 1,4-bis(4-aminophenoxy)benzene. These may be used alone or in combinations of two or more. Particularly preferred among these is BAPP, from the viewpoint of maintaining balance of properties of the modified polyamideimide resin and lowering cost.

As specific examples of diamines represented by general formula (3b) there may be mentioned polyoxyalkylenediamines such as polyoxypropylenediamine and polyoxyethylenediamine, alkylenediamines such as propylenediamine and hexamethylenediamine, and alicyclic diamines such as 2,2-bis[4-(4-aminocyclohexyloxy)cyclohexyl]propane, bis[4-(3-amino cyclohexyloxy)cyclohexyl]sulfone, bis[4-(4-aminocyclohexyloxy)cyclohexyl]sulfone, 2,2-bis[4-(4-aminocyclohexyloxy)cyclohexyl]hexafluoropropane, bis[4-(4-aminocyclohexyloxy)cyclohexyl]methane, 4,4'-bis(4-aminocyclohexyloxy)dicyclohexyl, bis[4-(4-aminocyclohexyloxy)cyclohexyl]ether, bis[4-(4-amino cyclohexyloxy)cyclohexyl]ketone, 1,3-bis(4-aminocyclohexyloxy)benzene, 1,4-bis(4-aminocyclohexyloxy)benzene, 2,2'-dimethylbicyclohexyl-4,4'-diamine, 2,2'-bis(trifluoromethyl)dicyclohexyl-4,4'-diamine, 2,6,2',6'-tetramethyldicyclohexyl-4,4'-diamine, 5,5'-dimethyl-2,2'-sulfonyl-dicyclohexyl-4,4'-diamine, 3,3'-dihydroxydicyclohexyl-4,4'-diamine, (4,4'-diamino)dicyclohexyl ether, (4,4'-diamino)dicyclohexylsulfone, (4,4'-diaminocyclohexyl)ketone, (3,3"diamino)benzophenone, (4,4'-diamino)dicyclohexylmethane, (4,4'-diamino)dicyclohexyl ether, (3,3'-diamino)dicyclohexyl ether and 2,2-bis(4-aminocyclohexyl)propane. These may also be used alone or in combinations of two or more.

Particularly preferred among these are polyoxypropylenediamines represented by the following general formula (27'), from the viewpoint of improving the adhesion and toughness of the adhesive composition.

[Chemical Formula 6]

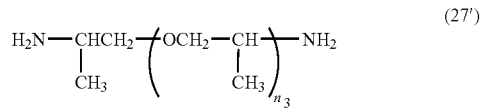

(27')

[In the formula, $n_3$ represents an integer of 1-70.]

From the viewpoint of further improving the adhesion and toughness of the adhesive composition, the amine equivalent value of the diamine represented by general formula (3b) above is preferably 50-5000 g/mol and more preferably 100-2000 g/mol.

The diamine represented by general formula (3b) above may be one obtained as a commercially available product. As examples of commercially available products there may be mentioned JEFFAMINE D-230 (trade name of San Techno Chemical Co., Ltd., amine equivalents: 115), JEFFAMINE D-400 (trade name of San Techno Chemical Co., Ltd., amine equivalents: 200), JEFFAMINE D-2000 (trade name of San Techno Chemical Co., Ltd., amine equivalents: 1000) and JEFFAMINE D-4000 (trade name of San Techno Chemical Co., Ltd., amine equivalents: 2000). These may also be used alone or in combinations of two or more.

As examples for the divalent organic groups represented by $R^1$ and $R^2$ in general formula (3c) above there may be mentioned alkylene groups such as methylene, ethylene and propylene, and arylene groups such as phenylene, tolylene and xylylene. As examples for the $C_{1-20}$ alkyl groups in general formula (3c) above there may be mentioned methyl, ethyl, n-propyl, isopropyl, n-butyl, isobutyl, sec-butyl, tert-butyl, pentyl, isopentyl, neopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and structural isomers of the foregoing. As examples for the $C_{6-18}$ aryl groups in general formula (3c) above there may be mentioned phenyl, naphthyl, antholyl and phenantholyl, which may be further substituted with halogen atoms, amino, nitro, cyano, mercapto, allyl, $C_{1-20}$ alkyl and the like.

The diamine represented by general formula (3c) above may be one obtained as a commercially available product. As commercially available products there may be mentioned the amino-modified silicone oils X-22-161AS (trade name of Shin-Etsu Chemical Co., Ltd., amine equivalents: 450), X-22-161A (trade name of Shin-Etsu Chemical Co., Ltd., amine equivalents: 840), X-22-161B (trade name of Shin-Etsu Chemical Co., Ltd., amine equivalents: 1500), BY16-853 (trade name of Toray Dow Corning Silicone Co., Ltd., amine equivalents: 650) and BY16-853B (trade name of Toray Dow Corning Silicone Co., Ltd., amine equivalents: 2200). These may be used alone or in combinations of two or more.

From the viewpoint of improving the adhesion of the modified polyamideimide resin, the amine equivalent value of the diamine represented by general formula (3c) above is preferably 400-1500 g/mol, more preferably 600-1100 g/mol and even more preferably 700-900 g/mol. From this viewpoint, X-22-161A (trade name of Shin-Etsu Chemical Co., Ltd., amine equivalents: 840) and X-22-161B (trade name of Shin-Etsu Chemical Co., Ltd., amine equivalents: 1500), for example, may be suitably used.

As examples of aromatic diisocyanates for this embodiment there may be mentioned 4,4'-diphenylmethane diisocyanate represented by chemical formula (2a) above (hereinafter abbreviated as "MDI"), 2,4-tolylene diisocyanate represented by chemical formula (2b) above, 2,6-tolylene diisocyanate represented by chemical formula (2c) above (the diisocyanates represented by chemical formulas (2b) and (2c) will hereinafter be abbreviated as "TDP"), 2,4-tolylene dimer represented by chemical formula (2d) above and naphthalene-1,5-diisocyanate represented by chemical formula (2e) above. These may be used alone or in combinations of two or more.

MDI is preferred among those mentioned above, from the viewpoint of imparting suitable flexibility to the adhesive composition and preventing crystallization. An aliphatic diisocyanate such as hexamethylene diisocyanate, 2,2,4-trimethylhexamethylene diisocyanate or isophorone diisocyanate may also be included in addition to the aromatic diisocyanate. From the viewpoint of improving the heat resistance, it is preferred to use an aliphatic diisocyanate at about 5-10 mol with respect to 100 mol of the aromatic diisocyanate.

A preferred production process for obtaining a modified polyamideimide resin using these starting materials will now be explained. First a diamine mixture containing the diamines represented by general formulas (3a), (3b) and (3c) above is mixed with trimellitic anhydride (hereinafter, "TMA"), and an aprotic polar solvent is further added.

Here, the mixing ratio of each with respect to 100 mol as the total of the diamine mixture, is preferably (3a)/(3b)/(3c): (0.0-70.0) mol/(10.0-70.0) mol/(10.0-50.0) mol, and more preferably (0.0-65.0) mol/(20.0-60.0) mol/(10.0-40.0) mol. If the diamines are not mixed in this mixing ratio, warping will occur, or the molecular weight of the modified polyamideimide resin will be reduced, thus tending to lower the adhesion and toughness of the obtained adhesive film.

The TMA content is preferably 2.05-2.20 mol and more preferably 2.10-2.15 mol with respect to 1 mol of the diamine mixture. If the TMA content is not within this range, the amine mixture or TMA will remain after the reaction, thus tending to lower the molecular weight of the obtained modified polyamideimide resin.

The aprotic polar solvent is preferably an organic solvent that does not react with the diamine mixture or TIVIA. As specific examples there may be mentioned dimethylacetamide, dimethylformamide, dimethyl sulfoxide, N-methyl-2-pyrrolidone, γ-butyrolactone, sulfolane and cyclohexanone. These may be used alone or in combinations of two or more. The reaction will generally be carried out under high-temperature conditions, and N-methyl-2-pyrrolidone is preferably used as a solvent with a high boiling point. The modified polyamideimide resin preferably dissolves in these organic solvents.

The amount of aprotic polar solvent used is preferably 10-80 parts by weight and more preferably 50-80 parts by weight with respect to 100 parts by weight as the total of the diamine mixture and TMA. If it is used at less than 10 parts by weight the TMA will not dissolve sufficiently, and production of diimidedicarboxylic acid will tend to be impaired. The moisture content of the aprotic polar solvent is preferably 0.1-0.2 part by weight. If the moisture content exceeds 0.2 part by weight, the trimellitic acid produced by hydration of TMA will prevent the reaction from proceeding sufficiently and will lower the molecular weight of the modified polyamideimide resin.

The organic solvent must be volatilized off at the end, and it is preferably used in as small an amount as necessary since it affects the environment and the human body. The amount of organic solvent used also affects production cost, since for volatilization of the organic solvent it is forcibly removed by heating or the like to shorten the production steps. Using the aforementioned adhesive composition according to the invention can reduce the amount of organic solvent used.

The reaction mixture obtained by mixing the starting materials is heated to 50-90° C. and the diamine mixture and TMA are reacted for a period of 0.2-1.5 hours. An aromatic hydrocarbon that can be azeotropically distilled with water is loaded into the reaction mixture at a 0.1-0.5 weight ratio with respect to the aprotic polar solvent, and the mixture is heated to 120-180° C. The aromatic hydrocarbon that can be azeotropically distilled with water may be, for example, toluene or xylene. Toluene is preferably used because it has a relatively low boiling point and is non-toxic.

Thus, a diimidedicarboxylic acid mixture containing diimidedicarboxylic acids represented by general formulas (1a)-(1c) above is obtained. Next, an aromatic diisocyanate is added to the mixture containing the diimidedicarboxylic acid mixture, and the solution is heated to 150-250° C. for reaction over a period of 0.5-3 hours to form a modified polyamideimide resin.

The aromatic diisocyanate content is preferably 1.05-1.50 mol and more preferably 1.1-1.3 mol with respect to 1 mol of the diimidedicarboxylic acid mixture. A molar ratio of less than 1.05 will tend to result in gelling of the modified polyamideimide resin, while a molar ratio of greater than 1.50 will tend to lower the molecular weight of the obtained modified polyamideimide resin.

The weight-average molecular weight of the modified polyamideimide resin is preferably 30,000-300,000, more preferably 40,000-200,000 and even more preferably 50,000-100,000. If the weight-average molecular weight is less than 30,000 the strength and flexibility of the adhesive film will be reduced, while the tack will be increased and the microlayer separated structure will be lost, and if it is greater than 300,000 the flexibility and adhesion of the adhesive film will tend to be reduced. The weight-average molecular weight is the value measured by gel permeation chromatography and calculated using a calibration curve prepared using standard polystyrene.

A thermosetting resin is a component that cures by heat or the like in the presence of a curing agent or curing accelerator. The thermosetting resin preferably has a functional group that can react with the amide group in the modified polyamideimide resin backbone upon heating or the like. Specifically, there may be mentioned epoxy resins with two or more epoxy groups, phenol resins and bismaleimidetriazine resins. Epoxy resins are preferred among these from the viewpoint of adhesion and handleability. These may be used alone or in combinations of two or more.

As epoxy resins there may be mentioned any that are liquid with two or more epoxy groups, such as bisphenol A-type or bisphenol F-type resins. Particularly preferred are epoxy resins with alicyclic groups such as tetrahydrodicyclopentadiene rings (for example, dicyclopentadiene-type epoxy resins). The epoxy resin may be obtained as a commercially available product. As examples of commercially available products there may be mentioned EPIKOTE 827 (trade name of Yuka-Shell Epoxy Co., Ltd.), EPIKOTE 828 (trade name of Yuka-Shell Epoxy Co., Ltd.), EPOMIK R140P (trade name of Mitsui Petroleum Chemical Co., Ltd.), EPOMIK R110 (trade name of Mitsui Petroleum Chemical Co., Ltd.), YD 127 (trade name of Tohto Kasei Co., Ltd.), YD128 (trade name of Tohto Kasei Co., Ltd.), YDF170 (trade name of Tohto Kasei Co., Ltd.), the cresol-novolac-type epoxy resins N660, N670, N-680, N-695, N-673-80 M, N-680-75 M and N-690-75 M (trade names of Dainippon Ink and Chemicals, Inc.), the naphthalene-type epoxy resins EPICLON HP4032 and HP4032D (trade names of Dainippon Ink and Chemicals, Inc.), and the dicyclopentadiene-type epoxy resins HP7200 and HP7200 L (trade names of Dainippon Ink and Chemicals, Inc.). These may be used alone or in combinations of two or more. The epoxy equivalent value of the epoxy resin is preferably 150-4000 and more preferably 160-400.

The thermosetting resin content is preferably 5-100 parts by weight and more preferably 5-80 parts by weight with respect to 100 parts by weight of the modified polyamideimide resin. If the content is less than 5 parts by weight the curing function will tend to be reduced, and if it is greater than 100 parts by weight the post-curing adhesive property will tend to be reduced.

A curing agent or curing accelerator is a component that reacts with the thermosetting resin to cure it, or that accelerates curing of the thermosetting resin. The curing agent or curing accelerator preferably promotes reaction between the modified polyamideimide resin and thermosetting resin. When an epoxy resin is used as the thermosetting resin, a known curing agent commonly used as a curing agent therefor may be used, and as specific examples there may be mentioned amines, imidazoles and phenol resins (phenol-novolac resins and the like). These may be used alone or in combinations of two or more. As examples of amines there may be mentioned dicyandiamide, diaminodiphenylmethane and guanylurea. These may also be used alone or in combinations of two or more. As examples of imidazoles there may be mentioned alkyl group-substituted imidazoles such as 2-ethyl-4-methylimidazole, and benzoimidazoles. These may also be used alone or in combinations of two or more. As examples of commercially available phenol resins there may be mentioned PHENOLITE, KA1160 (trade name of Dainippon Ink and Chemicals, Inc.) and TD2131 (trade name of Dainippon Ink and Chemicals, Inc.). From the viewpoint of improving the adhesion and heat resistance, a phenol resin is preferably used as the curing agent when an epoxy resin is used as the thermosetting resin.

The curing agent or curing accelerator content is preferably an amount such that, in the case of an amine, the active hydrogen equivalents of the amine (amine equivalents) and the epoxy equivalents of the epoxy resin are approximately equal, or in the case of an imidazole, it is preferably 0.1-2.0 parts by weight with respect to 100 parts by weight of the epoxy resin. A content of less than 0.1 part by weight will result in residue of the uncured epoxy resin, tending to lower the glass transition point temperature of the crosslinked resin, while a content of greater than 2.0 parts by weight will result in residue of the unreacted curing accelerator, tending to reduce the pot life and insulating property.

An adhesive film will now be described with reference to FIG. 1. FIG. 1 is a cross-sectional view showing an embodiment of an adhesive film. The adhesive film 1 comprises a support film 3 and an adhesive layer 2.

The support film 3 may be, for example, a polyolefin such as polyethylene or polyvinyl chloride, a polyester such as polyethylene terephthalate, polycarbonate, a Teflon® film, a polyphenylene sulfide film, a liquid crystal polymer (for example, BECKSTAR®) film, a release sheet, or a metal foil such as a copper foil, aluminum foil or SUS foil. These may also be used alone or in combinations of two or more. The thickness of the support film 3 is preferably 25-200 µm. When the adhesive layer 2 is to be removed alone, a release-treated support film 3 may be used.

The adhesive layer 2 may be obtained by coating the support film 3 with a varnish of the adhesive composition of the invention, and then heat drying it to remove the solvent. The heating conditions are such for an adhesive composition reaction rate of 5-10%. The drying temperature is preferably 120° C.-150° C. for most cases. The thickness of the adhesive layer 2 is preferably 3-100 µm and more preferably 5-50 µm.

The adhesive film 1 may be in the form of a sheet or roll, for example, cut to a prescribed length. From the viewpoint of storage life, productivity and manageability, a protective film is preferably further laminated on the surface of the adhesive film 1 before winding up into a roll for storage. The protective film may be the same as the support film 1, such as for example, a polyolefin such as polyethylene or polypropylene, a polyester such as polyethylene terephthalate, polycarbonate, a Teflon® film or a release sheet. The thickness of the protective film is more preferably 20-100 µm. The protective film may be subjected to mat treatment, corona treatment and release treatment.

As another embodiment of the adhesive film, the support film may be a polyimide film and one or both sides of the polyimide film may be laminated with the adhesive layer. The adhesive film may be used as a cover lay film for a flexible printed circuit board, or as a base film. Also, a metal foil or the like may be laminated in contact with the adhesive layer to form a board for a flexible printed circuit board.

The board for a printed circuit board is formed in lamination with an insulating film, adhesive layer and a copper foil or other metal foil, the metal foil being laminated after forming the adhesive layer on the insulating film, or alternatively the insulating film being laminated after forming the adhesive layer on the metal foil.

The method of forming the board for a printed circuit board using the adhesive composition of the invention may be, for example, a method in which the insulating film is directly coated with a varnish of the adhesive composition and heated or hot air-blown to dry off the solvent and form an adhesive layer, and a hot press or heated roll apparatus is used to attach the metal foil onto the adhesive layer. An adhesive film may be used instead of the adhesive composition varnish. When an adhesive film is used, the support film of the adhesive film may be removed first before the adhesive layer is laminated on the insulating layer, or the support film may be removed after lamination.

The invention was explained above in detail based on embodiments thereof. However, the invention is not limited to these described embodiments. The invention may also be applied in a variety of modifications so long as the gist thereof is maintained.

EXAMPLES

Examples of the invention will now be explained in more specific detail, but they are not intended to restrict the invention.

(Synthesis of Modified Polyamideimide Resin)

First, there was prepared a 1 liter separable flask equipped with a cock-stoppered 25 ml water-measuring receptacle, connected to a reflux condenser, and a thermometer and stirrer. Into the flask were charged BAPP (2,2-bis[4-(4-aminophenoxy)phenyl]propane) as a diamine represented by general formula (3a) above, the polyoxypropylenediamine JEFFAMINE D-2000 (trade name of San Techno Chemical Co., Ltd., amine equivalents: 1000, $n_3$ average: 33.1) as a diamine represented by general formula (27') above, the reactive silicone oil X-22-161A (trade name of Shin-Etsu Chemical Co., Ltd., amine equivalents: 840, $n_1$ average: 10-60) as a diamine represented by general formula (3c) above, and NMP (N-methyl-2-pyrrolidone) and γ-BL (γ-butyrolactone) as aprotic polar solvents, and trimellitic anhydride (TMA), in the mixing ratio shown in Table 1 to obtain a reaction mixture, which was stirred for 30 minutes while heating at 80° C. After loading 100 ml of toluene as an aromatic hydrocarbon capable of forming an azeotropic mixture with water, the temperature was raised to approximately 160° C. for 2 hours of reflux. When approximately 3.6 ml or more of water had accumulated in the water measuring receptacle, cessation of water effusion was confirmed, and the temperature was raised to about 190° C. for removal of the toluene from the reaction mixture while removing the water effusion accumulated in the water measuring receptacle. The units for the amounts are parts by weight.

[Chemical Formula 7]

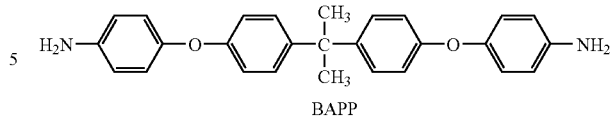

BAPP

The reaction mixture was returned to room temperature (25° C.), and then MDI (4,4'-diphenylmethane diisocyanate) and TDI (2,4-tolylene diisocyanate) were loaded into the reaction mixture as aromatic diisocyanates in the mixing ratio shown in Table 1, and reaction was conducted at 190° C. for 2 hours. Upon completion of the reaction, NMP was added to obtain modified polyamideimide resin NMP solutions A-1 to A-3.

TABLE 1

|  | A-1 | A-2 | A-3 |
|---|---|---|---|
| BAPP | 23 | 26 | 29 |
| JEFFAMINE D2000 | 123 | 107 | 93 |
| X-22-161A | 68 | 68 | 68 |
| TMA | 61 | 61 | 61 |
| NMP | 400 | 400 | 400 |
| γ-BL | 200 | 200 | 200 |
| MDI | 27 | 27 | 27 |
| TDI | 13 | 13 | 13 |
| Weight-average molecular wt. | 90000 | 85000 | 80000 |

The starting materials shown in Table 2 were mixed with the obtained modified polyamideimide resins A1 to A3 in the amounts listed, and after stirring for approximately 1 hour until the resin became homogeneous, it was allowed to stand at room temperature for 24 hours for degassing to obtain an adhesive composition solution. The thermosetting resins used were the dicyclopentadiene-type epoxy resin EPICLON 7200H (trade name of Dainippon Ink and Chemicals, Inc.), the bisphenol A-type epoxy resin EPOMIK R-140P (trade name of Mitsui Petroleum Chemical Co., Ltd.) and NBR (product of JSR Corp.). As epoxy resin curing agents there were used the phenol resin PHENOLITE KA1160 (trade name of Dainippon Ink and Chemicals, Inc.) and the phenol-novolac resin TD2131 (trade name of Dainippon Ink and Chemicals, Inc.). The units for the amounts are parts by weight.

TABLE 2

|  |  | Example | | | Comp. Ex. | |
|---|---|---|---|---|---|---|
|  |  | 1 | 2 | 3 | 1 | 2 |
| Component (A): Modified polyamideimide resin | A-1 | 219 | — | — | — | — |
|  | A-2 | — | 219 | — | — | — |
|  | A-3 | — | — | 219 | — | — |
|  | A-4 | — | — | — | — | — |
| Component (B): Epoxy resin | EPICLON 7200H | 30 | 30 | 30 | — | — |
|  | EPOMIK R-140P | — | — | — | 70 | 50 |
|  | NBR | — | — | — | — | 20 |
| Component (C): Curing agent or curing accelerator | PHENOLITE KA1160 | 4 | 4 | 4 | — | — |
|  | TD2131 | — | — | — | 30 | 30 |
|  | Dicyandiamide | 0.1 | 0.1 | 0.1 | — | — |
|  | 2-Ethyl-4-methylimidazole | 0.2 | 0.2 | 0.2 | 0.2 | 0.2 |
| Other | N-Methyl-2-Pyrrolidone | 40 | 40 | 40 | 50 | 50 |

Samples A-D were then prepared for evaluation of the adhesive compositions, by the following procedure. Sample A was used for measurement of the glass transition temperature, storage elastic modulus, relative permittivity and dielectric loss tangent, sample B was used for measurement of the thermal decomposition temperature and thermal expansion coefficient, sample C was used for evaluation of the adhesion and soldering heat resistance, and sample D was used for evaluation of the adhesion. The measurement and evaluation results are summarized in Table 3.

Sample A

The obtained adhesive composition solutions (Examples 1-3, Comparative Examples 1-2) were coated onto a 50 μm-thick Teflon® film (trade name: NAFLON TAPE, product of Nichias Corp.), and a drier was used for heating at 140° C. for 10 minutes to remove the solvent, to form an adhesive layer comprising an adhesive composition with a film thickness of 25 μm. This was followed by heat curing with a drier at 200° C. for 60 minutes, and the Teflon® film was released to obtain sample A.

Sample B

The obtained adhesive composition solutions (Examples 1-3, Comparative Examples 1-2) were coated onto a 50 μm-thick Teflon® film (trade name: NAFLON TAPE, product of Nichias Corp.), and a drier was used for heating at 140° C. for 10 minutes to remove the solvent, to form an adhesive layer comprising an adhesive composition with a film thickness of 60 μm. This was followed by heat curing at 200° C. for 60 minutes, and the Teflon® film was released to obtain sample B.

Sample C

The obtained adhesive composition solutions (Examples 1-3, Comparative Examples 1-2) were coated onto a 25 μm-thick polyimide film (trade name: KAPTONE 100V, product of Toray-DuPont Co., Ltd.), and a drier was used for heating at 140° C. for 10 minutes to remove the solvent, to form an adhesive layer comprising an adhesive composition with a film thickness of 25 μm. Next, a 35 μm rolled copper foil (trade name: BHY-22B-T by Nikko Materials Co., Ltd.) was attached with its roughened surface facing in contact with the adhesive layer, and they were hot pressed at a temperature of 200° C. and a pressure of 4 MPa for temporary bonding. A drier was then used for heat curing at 200° C. for 60 minutes to obtain a laminated body having the structure polyimide film/adhesive layer/rolled copper foil, to obtain sample C.

Sample D

The obtained adhesive composition solutions (Examples 1-3, Comparative Examples 1-2) were coated onto a 25 μm-thick polyimide film (trade name KAPTONE 100V, product of Toray-DuPont Co., Ltd.), and a drier was used for heating at 140° C. for 10 minutes to remove the solvent, to form an adhesive layer comprising an adhesive composition with a film thickness of 25 μm. Next, a 35 μm rolled copper foil (trade name: BHY-22B-T by Nikko Materials Co., Ltd.) was attached with its glossy surface side facing in contact with the adhesive layer, and they were hot pressed at a temperature of 200° C. and a pressure of 4 MPa for temporary bonding. A drier was then used for heat curing at 200° C. for 60 minutes to obtain a laminated body having the structure polyimide film/adhesive layer/rolled copper foil, to obtain sample D.

(Measurement of Glass Transition Temperature)

The glass transition temperature (Tg) of sample (A) was measured using a DVE dynamic viscoelasticity measuring apparatus (trade name of Rheometrix) under conditions of tensile mode, chuck distance: 22.5 mm, measuring temperature: −50 to 300° C., temperature-elevating rate: 5° C./min and measuring frequency: 10 Hz, and the maximum of the tan δ peak was used. The results are shown in Table 3.

(Measurement of Storage Elastic Modulus)

The storage elastic modulus was measured in the same manner as the Tg, and the value at 25° C. was used.

(Measurement of Thermal Decomposition Temperature)

For sample B (cured film alone), a TG-DTA analyzer (trade name of Seiko Instruments, Inc.) was used and the temperature at which the sample mass was reduced by 5% was recorded as the thermal decomposition temperature.

(Measurement of Thermal Expansion Coefficient)

For sample B (cured film alone), a TMA thermomechanical analyzer (trade name of Seiko Instruments, Inc.) was used to measure the coefficient of thermal expansion in a temperature range from 25° C. to the glass transition temperature.

(Measurement of Relative Permittivity and Dielectric Loss Tangent)

For sample B (cured film alone), an impedance/material analyzer (product of HP) was used for measurement under conditions of 1 GHz and 5 GHz frequency.

(Evaluation of Adhesion)

Sample C and sample D were used after forming 10 mm strip-like cuts in the adhesive layer. The adhesion of the sample was evaluated both after heating and standing for 240 hours at ordinary state at 150° C., and after standing for 30 hours at 121° C., 2 atm in a vapor-saturated state. As the evaluation method, the sample that had stood in an environment as described above was used for a 90° pull test under conditions with a measuring temperature of 25° C. and a peel rate of 10 mm/min, and the rolled copper foil peel strength (kN/m) was measured as the adhesion of the sample.

(Evaluation of Soldering Heat Resistance)

Sample C was used after cutting into a 20×20 mm square. The soldering heat resistance of the sample was evaluated both at ordinary state and after standing for 8 hours at 40° C., 90% humidity. As the evaluation method, the sample that had stood in an environment as described above was used to evaluate the presence or absence of abnormal outer appearance such as blistering or peeling after the sample had been allowed to float with the copper foil facing downward for 1 minute in a solder bath heated to 280° C. or 300° C. For the evaluation, "A" represents absence of abnormal outer appearance such as blistering, or peeling, and "B" represents presence of abnormal outer appearance such as blister or peeling.

TABLE 3

|  | Example 1 | Example 2 | Example 3 | Comp. Ex. 1 | Comp. Ex. 2 |
| --- | --- | --- | --- | --- | --- |
| Glass transition temperature (° C.) | 120 | 135 | 150 | 130 | 120 |
| Storage elastic modulus (MPa, 25° C.) | 550 | 700 | 950 | 1200 | 1000 |
| Thermal decomposition temperature (° C.) | 360 | 370 | 380 | 300 | 280 |
| Thermal expansion coefficient (ppm/° C.) | 200 | 190 | 180 | 200 | 220 |

TABLE 3-continued

|  |  | Example 1 | Example 2 | Example 3 | Comp. Ex. 1 | Comp. Ex. 2 |
|---|---|---|---|---|---|---|
| Relative permittivity | 1 GHz | 3.25 | 3.16 | 3.10 | 3.75 | 3.83 |
|  | 5 GHz | 3.10 | 3.03 | 3.00 | 3.55 | 3.64 |
| Dielectric loss tangent | 1 GHz | 0.030 | 0.028 | 0.025 | 0.041 | 0.043 |
|  | 5 GHz | 0.027 | 0.025 | 0.022 | 0.035 | 0.038 |
| Adhesion (KN/m) | Ordinary state | 1.4 | 1.3 | 1.2 | 1.0 | 1.0 |
|  | After standing at 150° C./240 hrs | 1.3 | 1.3 | 1.3 | 0.2 | 0.1 |
|  | After standing at 121° C./2 atm/30 hrs | 0.9 | 0.8 | 0.8 | 0.2 | 0.2 |
| Soldering heat resistance | Ordinary state | 300° C. float | A | A | A | B | B |
|  | After standing at 40° C./90% RH/8 hrs | 300° C. float | A | A | A | B | B |
|  |  | 280° C. float | A | A | A | B | B |

The invention claimed is:

1. A thermosetting adhesive composition comprising:
(A) a polyamideimide resin that has a polysiloxane chain and that dissolves in organic solvents,
(B) a thermosetting resin comprising an epoxy resin with tetrahydrodicyclopentadiene rings, and
(C) a curing agent or curing accelerator that respectively reacts with the thermosetting resin to cure it or accelerates curing of the thermosetting resin,
wherein the adhesive composition comprises the thermosetting resin at 5-100 parts by weight with respect to 100 parts by weight of the polyamideimide resin that has a polysiloxane chain, and
wherein the polyamideimide resin that has a polysiloxane chain and that dissolves in organic solvents is a resin obtained by reacting a diimidedicarboxylic acid mixture containing a diimidedicarboxylic acid represented by the following formula (1a), a diimidedicarboxylic acid represented by the following formula (1b) and a diimidedicarboxylic acid represented by the following formula (1c), with an aromatic diisocyanate represented by the following formula (2a), (2b), (2c), (2d) or (2e):

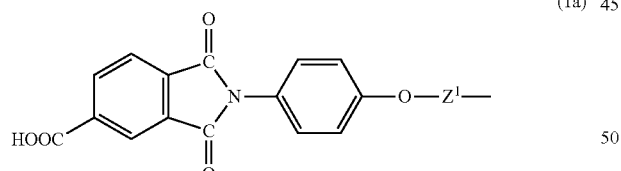
(1a)

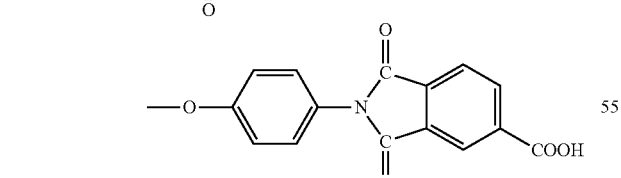
(1b)

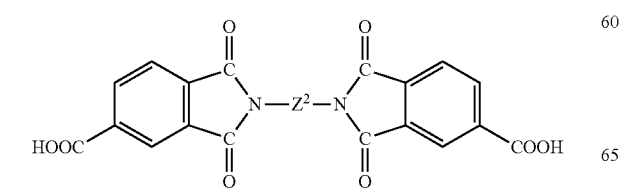

-continued

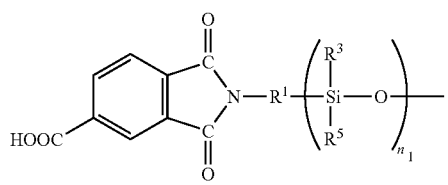
(1c)

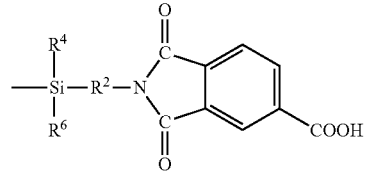

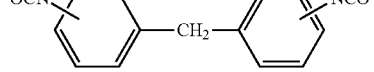
(2a)

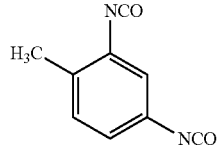
(2b)

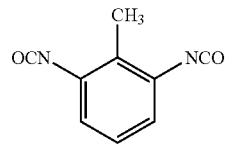
(2c)

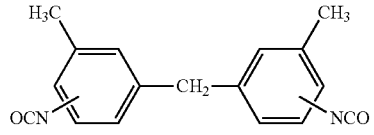
(2d)

(2e)

[$Z^1$ in formula (1a) is a divalent organic group represented by the following formula (11), (12), (13), (14), (15), (16), (17) or (18), $Z^2$ in formula (1b) is a divalent organic group represented by the following formula (21), (22), (23), (24), (25), (26) or (27), $R^1$ and $R^2$ in formula (1c) are each independently a divalent organic group, $R^3$, $R^4$, $R^5$ and $R^6$ are each independently a $C_{1-20}$ alkyl or $C_{6-18}$ aryl group, and $n_1$ represents an integer of 1-50,

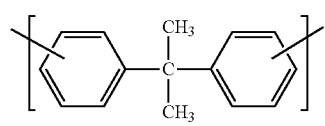 (11)

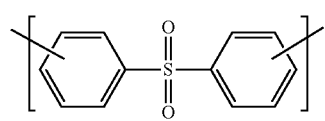 (12)

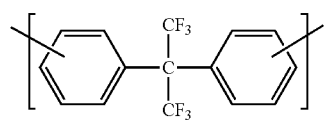 (13)

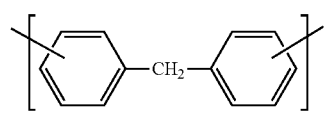 (14)

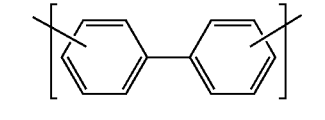 (15)

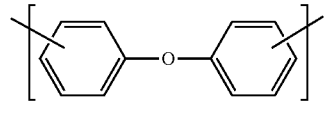 (16)

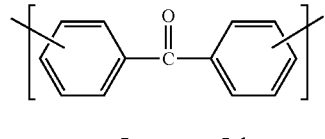 (17)

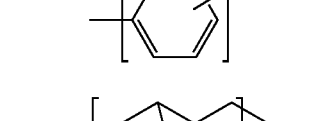 (18)

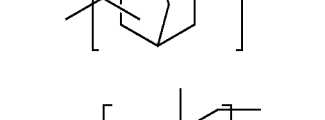 (21)

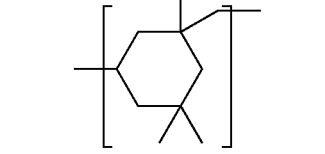 (22)

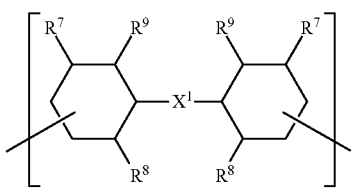 (23)

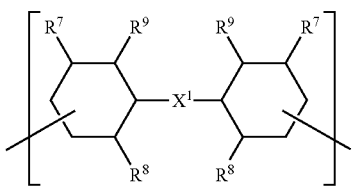 (23)

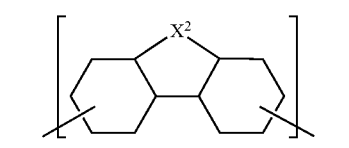 (24)

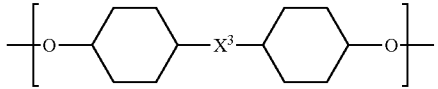 (25)

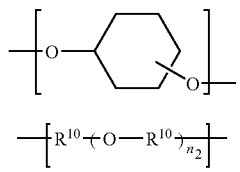 (26)

$$\left[R^{10}\!+\!O\!-\!R^{10}\!\right]_{n_2}\!\!\!\right]$$ (27)

$X^1$ in formula (23) is a $C_{1-3}$ aliphatic hydrocarbon, $C_{1-3}$ halogenated aliphatic hydrocarbon, sulfonyl, oxy, carbonyl or single bond, $R^7$, $R^8$ and $R^9$ are each independently hydrogen, hydroxyl, methoxy, methyl or a halogenated methyl group, $X^2$ in formula (24) is a $C_{1-3}$ aliphatic hydrocarbon, $C_{1-3}$ halogenated aliphatic hydrocarbon, sulfonyl, oxy or carbonyl group, $X^3$ in formula (25) is a $C_{1-3}$ aliphatic hydrocarbon, $C_{1-3}$ halogenated aliphatic hydrocarbon, sulfonyl, oxy, carbonyl or single bond, $R^{10}$ in formula (27) is an alkylene group, and $n_2$ represents an integer of 1-70].

2. The thermosetting adhesive composition according to claim 1, wherein the adhesive composition cures by heat to form a cured product with a glass transition temperature of 100-260° C.

3. An adhesive film comprising a support film, and an adhesive layer composed of the thermosetting adhesive composition according to claim 1.

4. The thermosetting adhesive composition according to claim 1, wherein the polyamideimide resin that has a polysiloxane chain contains a siloxane unit together with at least one of an aliphatic unit and an alicyclic unit from the diimidedicarboxylic acid represented by the formula (1b), as a relatively soft segment, and a diisocyanate-derived aromatic unit as a relatively hard segment.

5. The thermosetting adhesive composition according to claim 4, wherein said adhesive composition forms a microphase separation structure after curing.

6. The thermosetting adhesive composition according to claim 1, wherein the polyamideimide resin that has a polysiloxane chain has a weight-average molecular weight of 30,000 to 300,000.

7. The thermosetting adhesive composition according to claim 1, wherein the epoxy resin has at least two epoxy groups.

8. The thermosetting adhesive composition according to claim 1, wherein the thermosetting resin has a functional group that can react with the amide group in the polyamide-imide resin backbone with heating.

9. The thermosetting adhesive composition according to claim 1, which comprises 5-80 parts by weight of the thermosetting resin with respect to 100 parts by weight of the polyamideimide resin that has a polysiloxane chain.

* * * * *